Dec. 19, 1961 P. ADAMSON ETAL 3,014,120
STUD WELDING MACHINE FOR AEROFOIL SECTION STUDS
Filed March 10, 1959 18 Sheets-Sheet 1

INVENTORS
PERCY ADAMSON
JOHN S. STEWART
BY
ATTORNEY

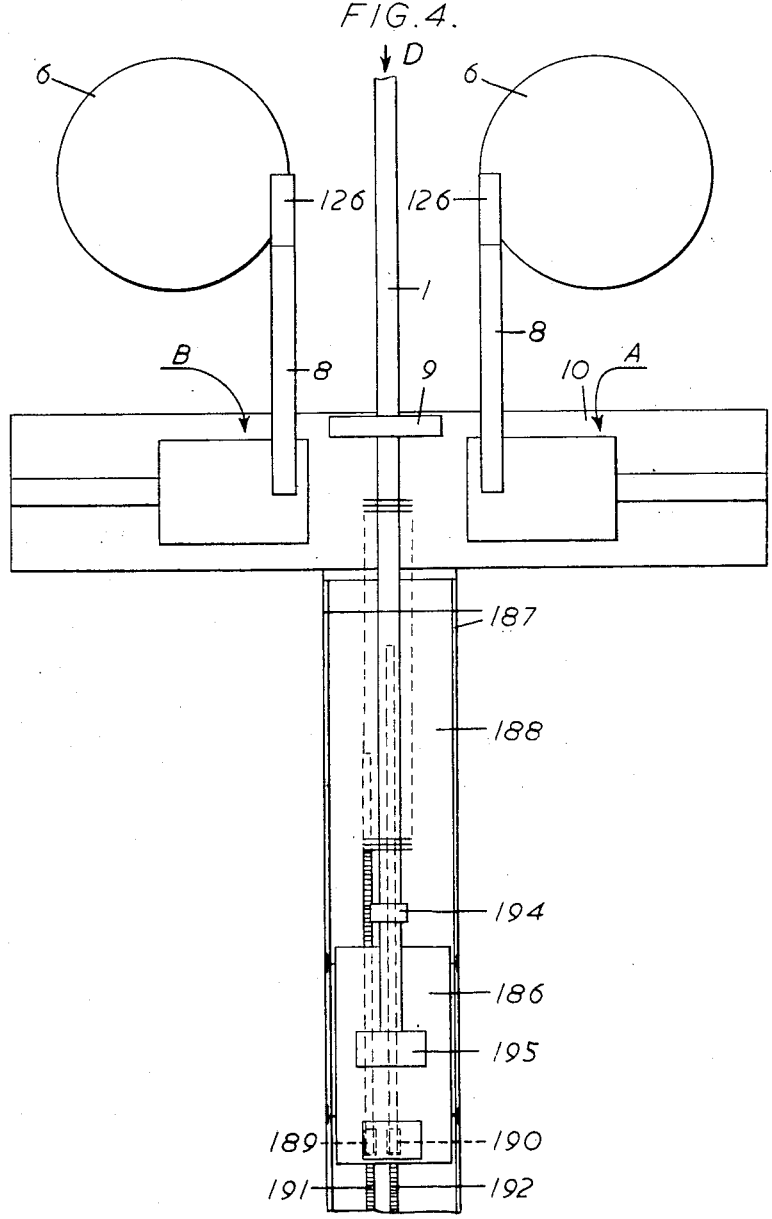

Dec. 19, 1961   P. ADAMSON ETAL   3,014,120
STUD WELDING MACHINE FOR AEROFOIL SECTION STUDS
Filed March 10, 1959   18 Sheets-Sheet 3
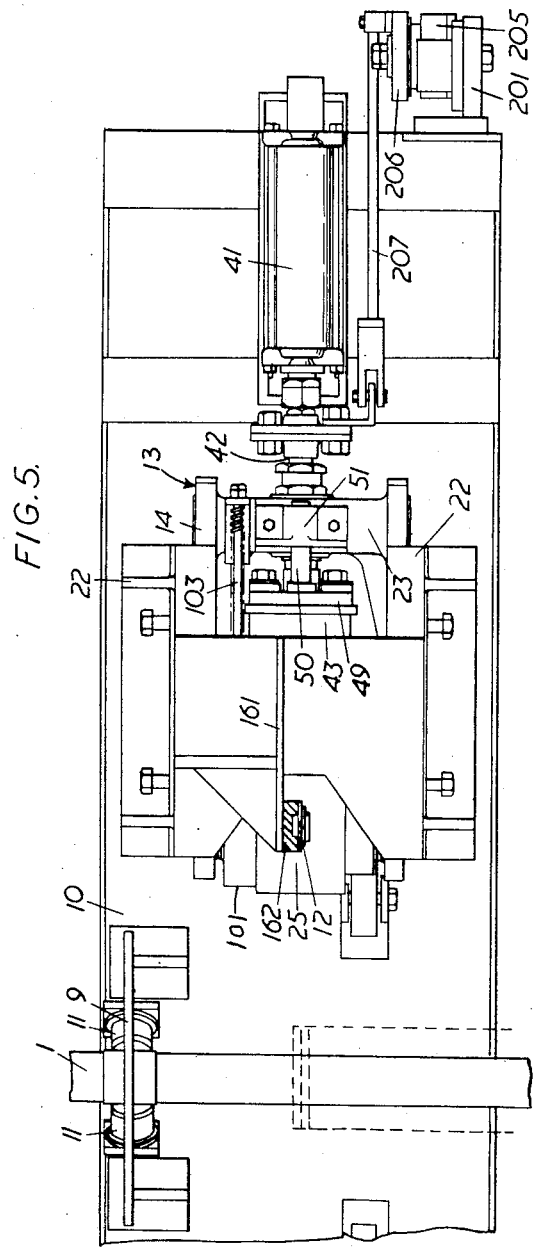
INVENTORS
PERCY ADAMSON
JOHN S. STEWART
BY
ATTORNEY Dec. 19, 1961     P. ADAMSON ETAL     3,014,120
STUD WELDING MACHINE FOR AEROFOIL SECTION STUDS
Filed March 10, 1959     18 Sheets-Sheet 4

INVENTORS
PERCY ADAMSON
BY JOHN S. STEWART
ATTORNEY

INVENTORS
PERCY ADAMSON
JOHN S. STEWART
BY
ATTORNEY

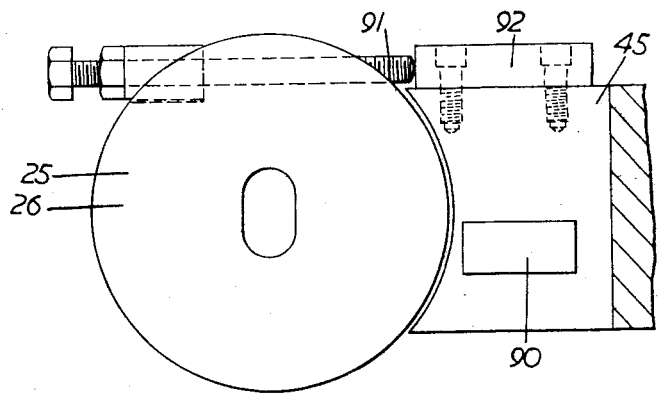
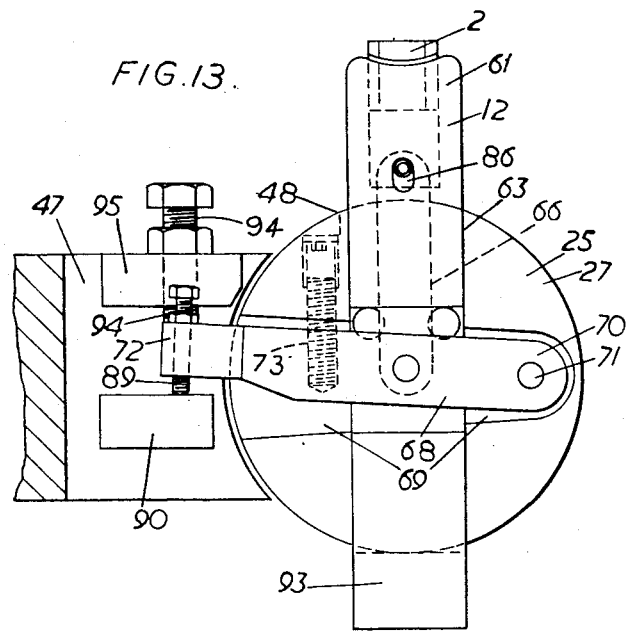

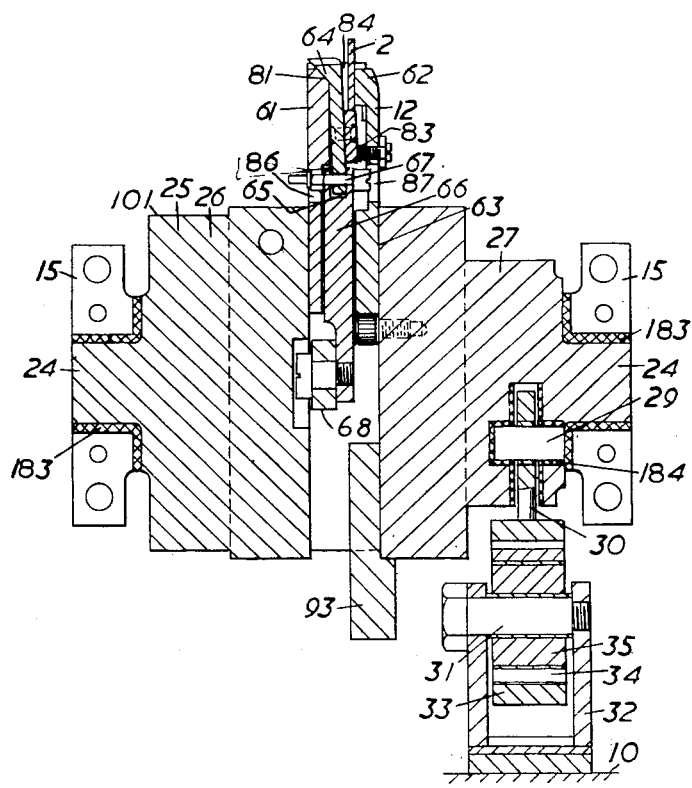

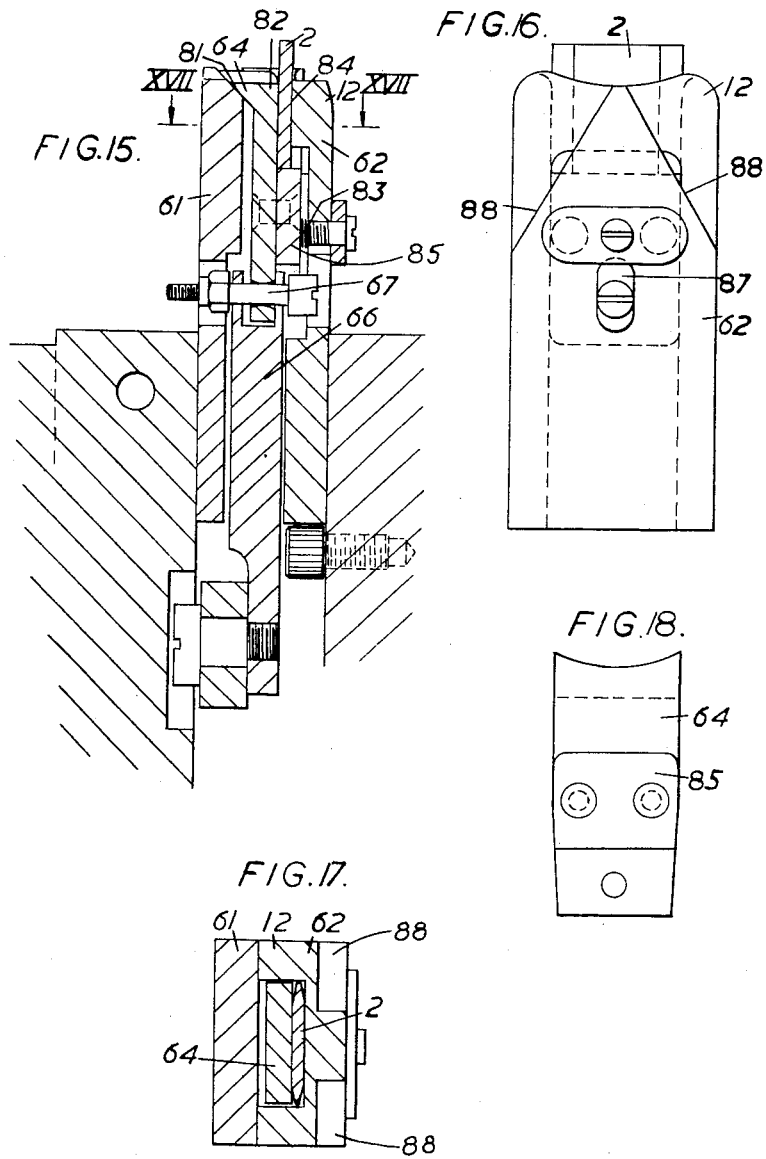

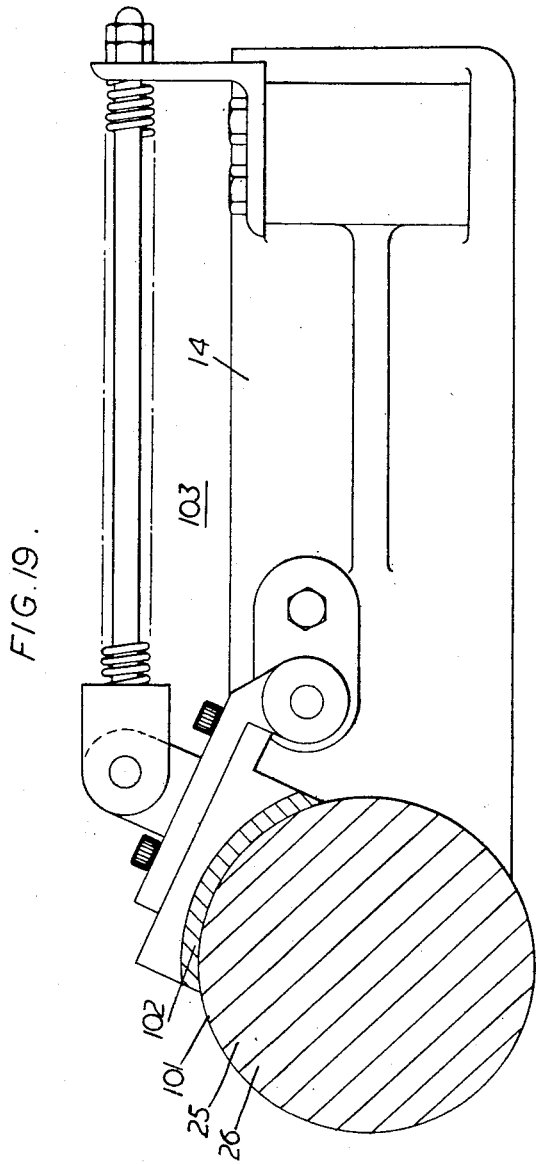

Dec. 19, 1961 P. ADAMSON ETAL 3,014,120
STUD WELDING MACHINE FOR AEROFOIL SECTION STUDS
Filed March 10, 1959 18 Sheets-Sheet 13

INVENTORS
PERCY ADAMSON
BY JOHN S. STEWART
ATTORNEY

Dec. 19, 1961   P. ADAMSON ETAL   3,014,120
STUD WELDING MACHINE FOR AEROFOIL SECTION STUDS
Filed March 10, 1959   18 Sheets-Sheet 14

INVENTORS
PERCY ADAMSON
BY JOHN S. STEWART

ATTORNEY

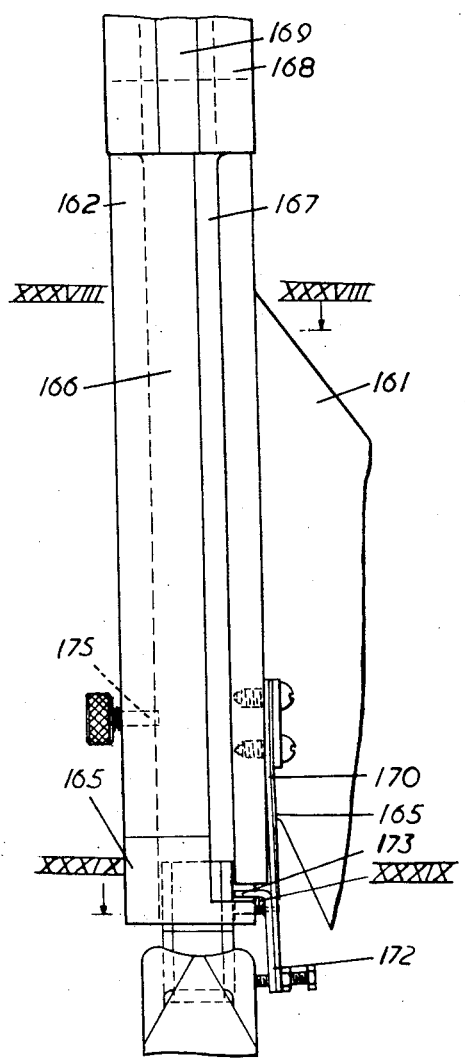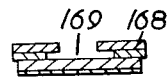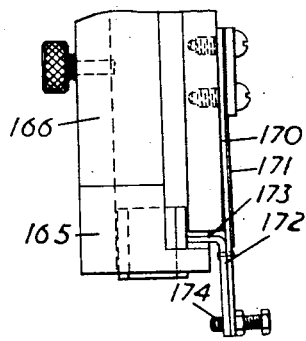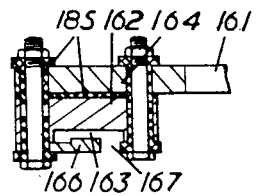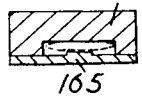

Dec. 19, 1961 P. ADAMSON ETAL 3,014,120
STUD WELDING MACHINE FOR AEROFOIL SECTION STUDS
Filed March 10, 1959 18 Sheets-Sheet 16

INVENTORS
PERCY ADAMSON
BY JOHN S. STEWART
ATTORNEY

Dec. 19, 1961   P. ADAMSON ETAL   3,014,120
STUD WELDING MACHINE FOR AEROFOIL SECTION STUDS
Filed March 10, 1959   18 Sheets-Sheet 17
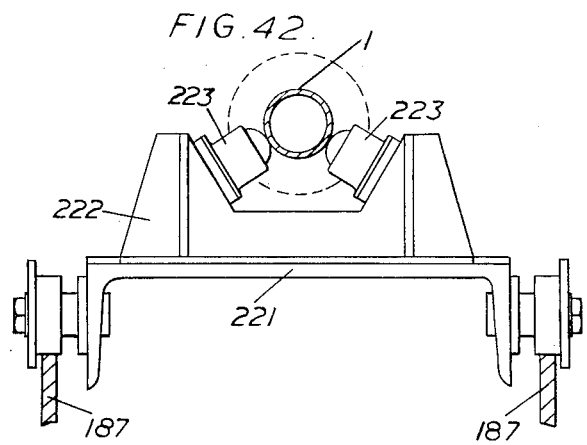
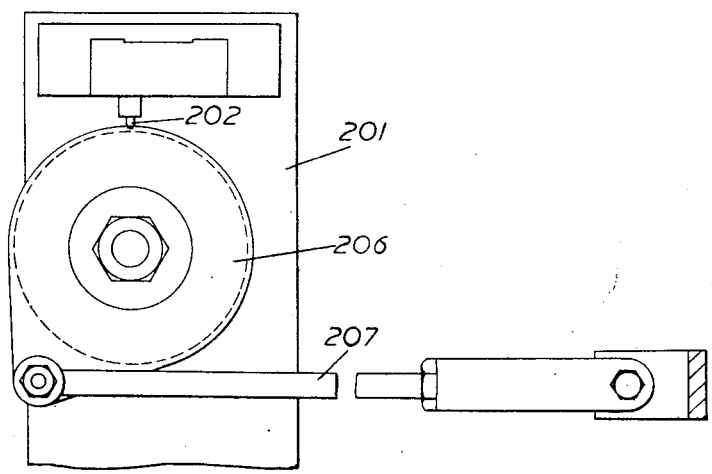
INVENTORS
PERCY ADAMSON
BY JOHN S. STEWART
ATTORNEY Dec. 19, 1961   P. ADAMSON ETAL   3,014,120
STUD WELDING MACHINE FOR AEROFOIL SECTION STUDS
Filed March 10, 1959   18 Sheets-Sheet 18

INVENTORS
PERCY ADAMSON
JOHN S. STEWART
BY
ATTORNEY

United States Patent Office 3,014,120
Patented Dec. 19, 1961

3,014,120
STUD WELDING MACHINE FOR AEROFOIL SECTION STUDS
Percy Adamson and John S. Stewart, Renfrew, Scotland, assignors to Babcock & Wilcox Limited, London, England, a company of Great Britain
Filed Mar. 10, 1959, Ser. No. 798,471
26 Claims. (Cl. 219—103)

This invention relates to machines for electrically welding a succession of studs to a surface. Hand-held machines are known which are manually loaded with a stud and manually or mechanically applied to resistance weld the stud to a heat exchanger tube, but their use is laborious for purposes such as the welding on of large numbers of studs that have to be applied to the tubes of large heat exchangers, while the devising of a fully automatic machine for successive stud welding has provided problems, particularly in respect of the system for making the studs available one by one, and more especially when, as for certain heat exchanger tubes, the studs are not regularly shaped, but rather of lenticular cross-section, or of a rectilinear approximation to such cross-section.

An object of the present invention is to provide a stud welding machine suitable for automatic operation having improved arrangements for stud feeding and welding.

According to the present invention a machine for welding a succession of studs to a surface includes means for moving a stud holder to and fro between a stud loading station and a stud welding station, stud feeding means capable of supplying a succession of studs from a stud reservoir, and stud dispensing means adapted to receive studs from the stud feeding means and to supply a stud to the stud holder each time a stud holder moves to the stud loading station.

The invention will now be described by way of example with reference to the accompanying drawings, in which:

FIGURE 4 is a diagrammatic plan view of a machine adapted for the application to a tube of studs to form the stud array shown in FIGURES 1 and 2;

FIGURE 5 is a plan view of means, in the machine part A of FIGURE 4, for moving a stud holder to and fro between a stud loading station and a stud welding station;

FIGURE 10 is an elevational view of certain elements of the stud-moving means in section on the line X—X of FIGURE 9;

FIGURE 12 is a sectional elevation view taken on the line XII—XII of FIGURE 9;

FIGURE 13 is a sectional elevation view taken on the line XIII—XIII of FIGURE 9;

FIGURE 14 is a sectional elevation view taken on the line XIV—XIV of FIGURE 9;

Figure 20:
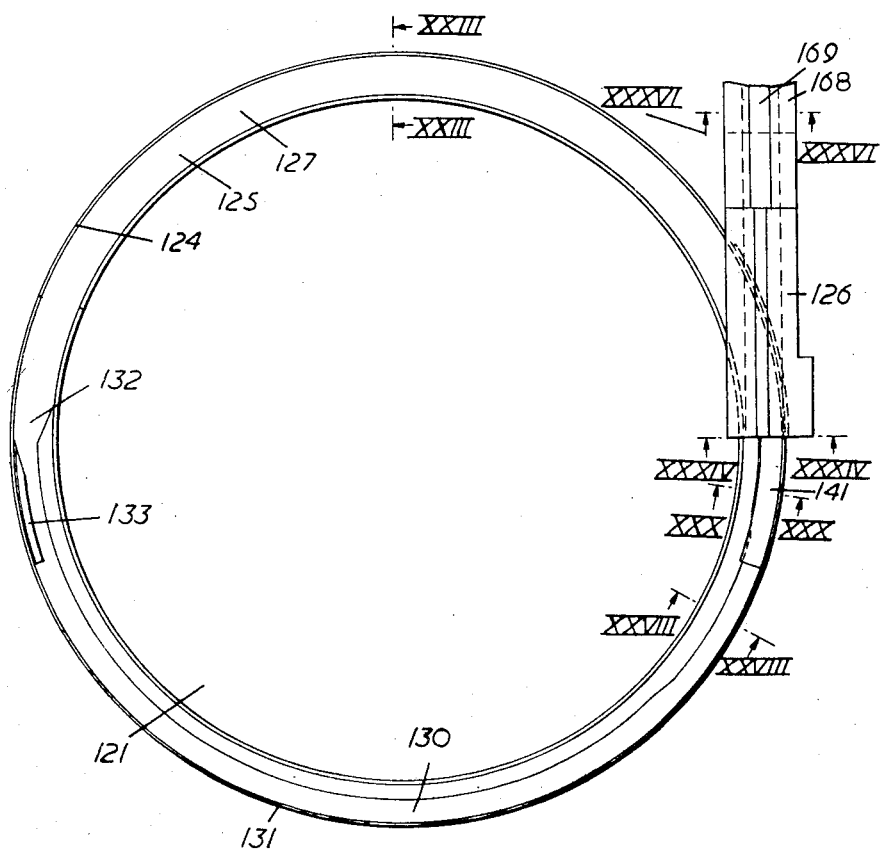
Figure 21:
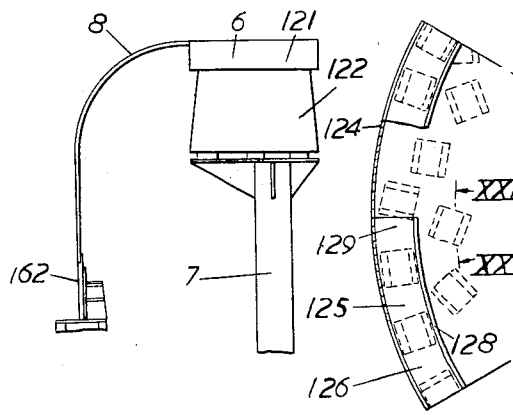
Figure 22:
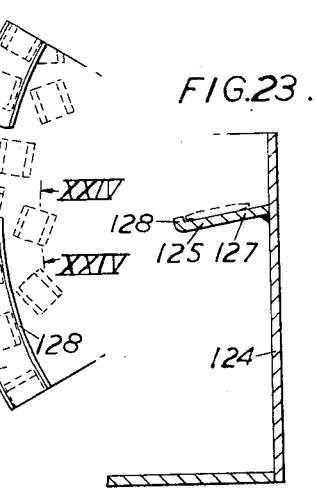
Figure 23:
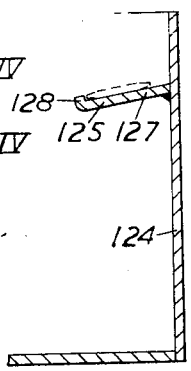
Figure 24:
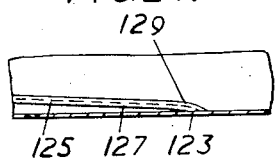
Figure 25:
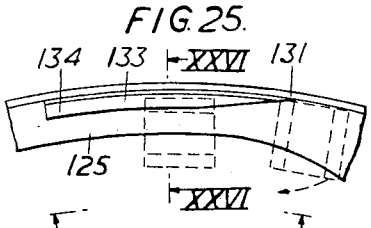
Figure 26:
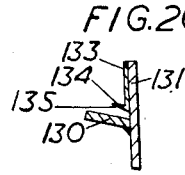
Figure 27:
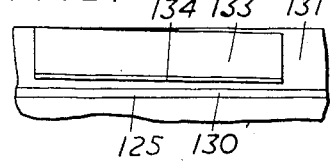
Figure 28:
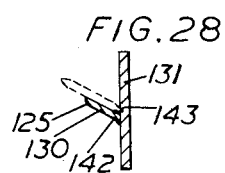
Figure 29:
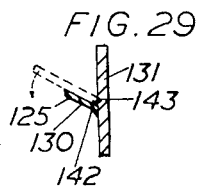
Figure 30:
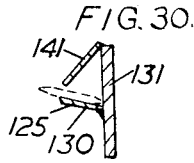
Figure 31:
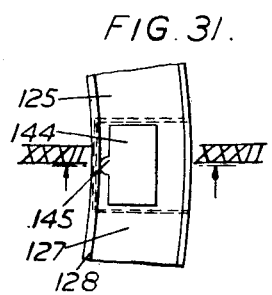
Figure 32:
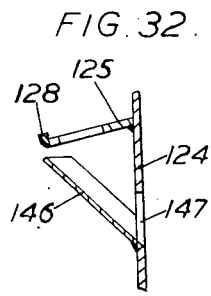
Figure 33:
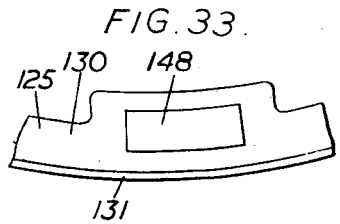
Figure 34:
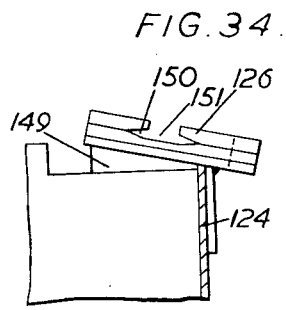
Figure 40:
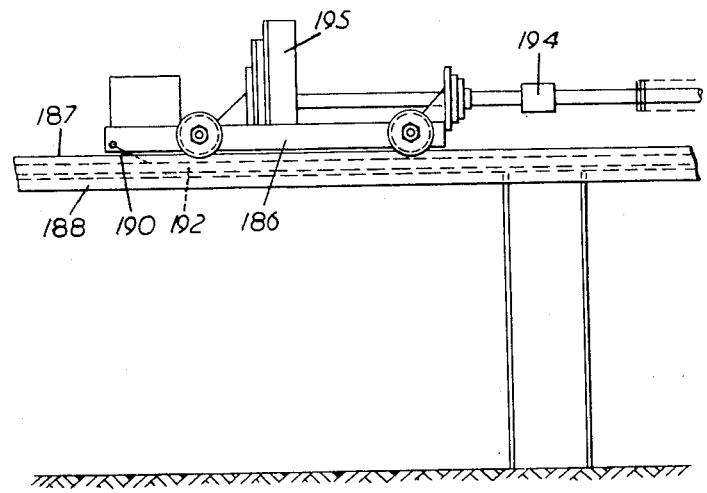
Figure 41:
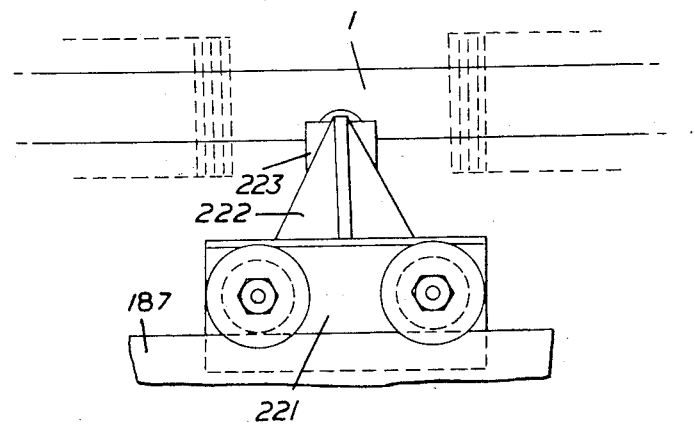
Figure 44:
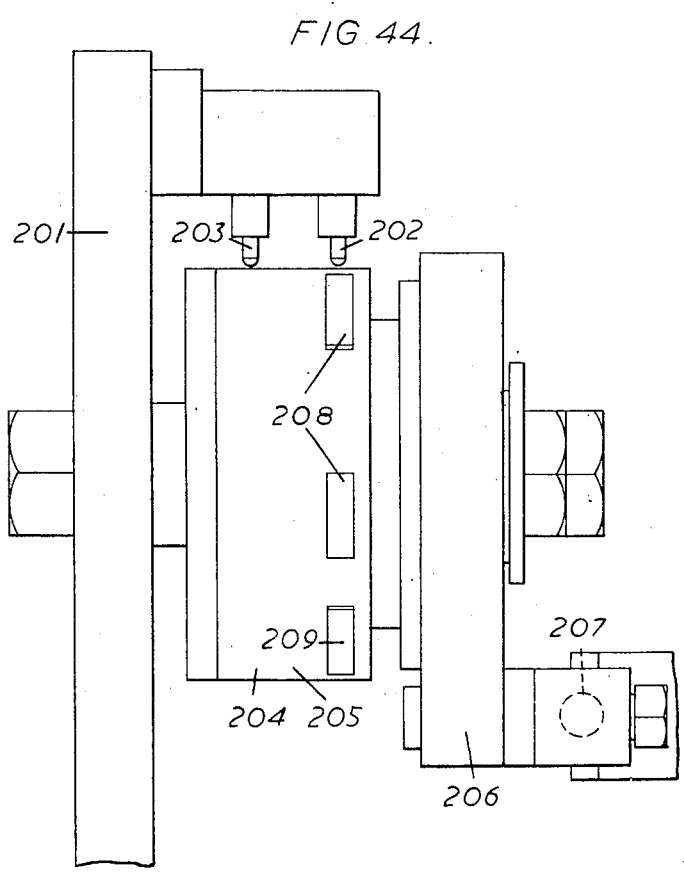

FIGURE 15 reproduces part of FIGURE 14 but shows certain elements in alternative relative positions;

FIGURE 16 is a detail elevation view of a stud holder or electrode removed from the machine;

FIGURE 17 is a view in section taken on the line XVII—XVII of FIGURE 15;

FIGURE 18 is an elevation of a stud grip removed from the electrode;

FIGURE 19 is a view of a brake on rotating parts of the stud-moving means;

FIGURE 20 is a plan view of a stud reservoir for the machine part A of FIGURE 4;

FIGURE 21 is a side elevation of the stud reservoir;

FIGURE 22 is a sectional plan view of part of the reservoir to show the start of a stud track therein;

FIGURE 23 is an elevation of part of the reservoir in section on the line XXIII—XXIII of FIGURE 20;

FIGURE 24 is an elevation of part of the reservoir in section on the line XXIV—XXIV of FIGURE 22;

FIGURE 25 is an enlargement of part of FIGURE 20;

FIGURE 26 is an elevation of part of the reservoir in section on the line XXVI—XXVI of FIGURE 25;

FIGURE 27 is an elevation of the same part of the reservoir viewed from the line XXVII—XXVII of FIGURE 25;

FIGURE 28 is an elevation of part of the reservoir in section on the line XXVIII—XXVIII of FIGURE 20; indicating a possible position of a stud on the stud track of the reservoir;

FIGURE 29 is the same elevation as FIGURE 28, but indicates an alternative position of a stud on the stud track;

FIGURE 30 is an elevation of part of the reservoir in section on the line XXX—XXX of FIGURE 20;

FIGURE 31 is a plan of part of the stud track to illustrate a modification;

FIGURE 32 is an elevation in section on the line XXXII—XXXII of FIGURE 31;

FIGURE 33 is a plan of part of the stud track to illustrate another modification;

FIGURE 34 is an elevation of part of the reservoir in section on the line XXXIV—XXXIV of FIGURE 20;

FIGURE 35 is an elevation of a stud magazine or feed termination piece in the machine part A of FIGURE 4;

FIGURE 36 is a section through a stud feed channel extending from the stud reservoir to the stud magazine;

FIGURE 37 reproduces the lower part of FIGURE 35, but shows certain elements in alternative relative positions;

FIGURE 38 is a sectional plan view on the line XXXVIII—XXXVIII of FIGURE 35;

FIGURE 39 is a plan view in section on the line XXXIX—XXXIX of FIGURE 35;

FIGURE 40 is a lateral elevation of part of a rearwardly extending bed carrying thereon a wheeled transporter for the tube;

FIGURE 41 is a side elevation of an intermediate support trolley for the studded tube;

FIGURE 42 is a front elevation of the intermediate support trolley of FIGURE 41;

FIGURE 43 is a front elevation of means associated with the machine part A of FIGURE 4 for controlling automatically the rotation and longitudinal movement of the tube during the process of being studded;

FIGURE 44 is a side elevation of the control means of FIGURE 43; and

Figure 45:
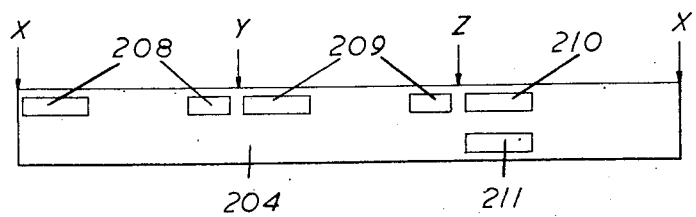

FIGURE 45 shows the arrangement of lands on the developed surface of a rotary member in the control means of FIGURE 43.

Figure 2:
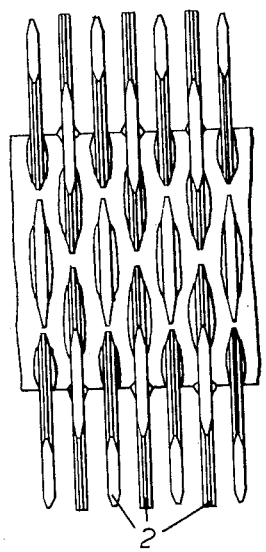
FIGURE 2 is a side elevation of part of the length of the studded tube.
Figure 3A:
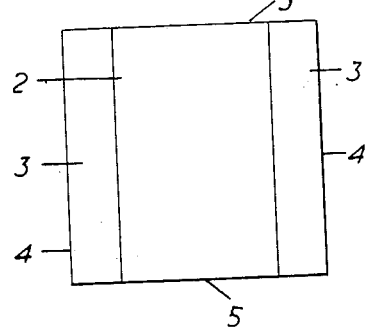
FIGURE 3a shows to a larger scale a detail side view of an individual stud intended for welding on to a tube surface.
Figure 3B:
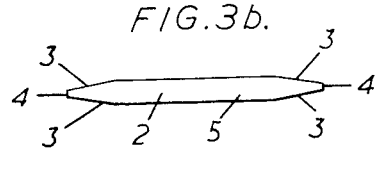
FIGURE 3b is an enlarged detail end view of the stud.

Referring to the drawings, the machine to be described is adapted for resistance welding a succession of flat fin-like 1 inch square studs 2 by their edge faces 5 to the outer surface of a tube 1, e.g., a tube having a 2 inch outside diameter, the array of welded-on studs on the studded tube surface (FIGURES 1 and 2) consisting of sets of studs. Each stud set includes six studs arranged in a plane perpendicular to the tube axis and disposed equiangularly around the tube, the stud sets being uniformly spaced at ¼ inch pitch along the tube and the studs of alternate sets being staggered with respect to the studs of the next adjacent sets. Each stud 2, as illustrated in FIGURES 3a and 3b, has a thickness of $3/32$ inch over the greater part of its area. Each of the four edges 3, parallel to one axis of the stud only, and which axis will be referred to as the axis of the stud, are chamfered at an angle of 10° to the plane of the stud. Preferably the chamfer extends $3/16$ inch from the edge faces 4 parallel to the stud axis. The faces 4 will be herein referred to as lateral edge faces to distinguish them from the other pair of edge faces 5 which will be referred to as end edge faces. In the array of welded-on studs the axis of each stud intersects the tube axis.

As will be more fully made clear, the machine is arranged for the application of the studs in pairs, each stud being applied simultaneously with a stud at the opposite end of the appropriate tube diameter. The tube 1 during the application of studs extends horizontally between two parts A and B of the machine, each of which is adapted for presenting a succession of studs to the tube surface in a horizontal direction perpendicular to the tube axis, and each of which includes stud feeding means including a reservoir 6 of loose studs and is mounted upon a pillar 7 (FIGURE 21) so as to be three or four feet above the level of the tube to be studded, and a feed channel 8 leading downwardly therefrom. The tube is rotated and moved longitudinally so as continuously to present fresh surfaces to be studded; the direction of the said longitudinal movement will be referred to as the rearward direction and is indicated by arrow "D," FIGURE 4.

Figure 6:
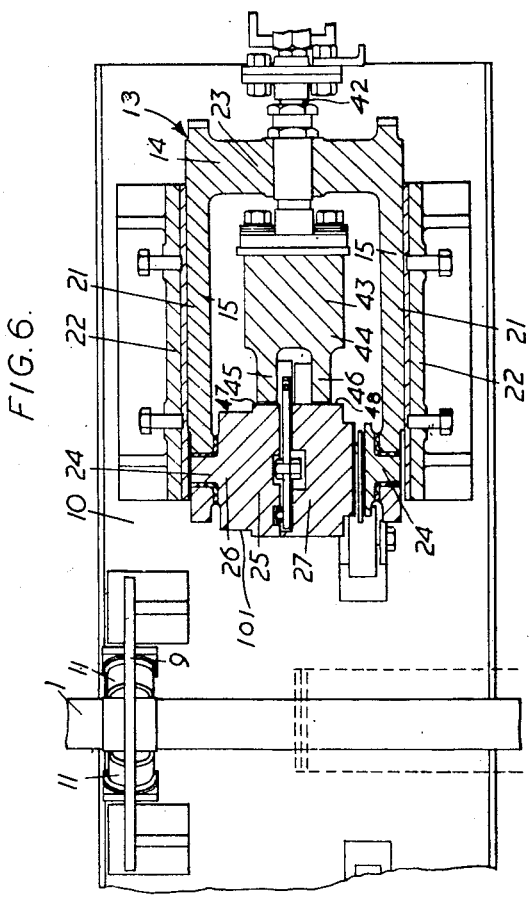
FIGURE 6 is a fragmentary sectional plan view of the stud-moving means shown in FIGURE 5.
Figure 7:
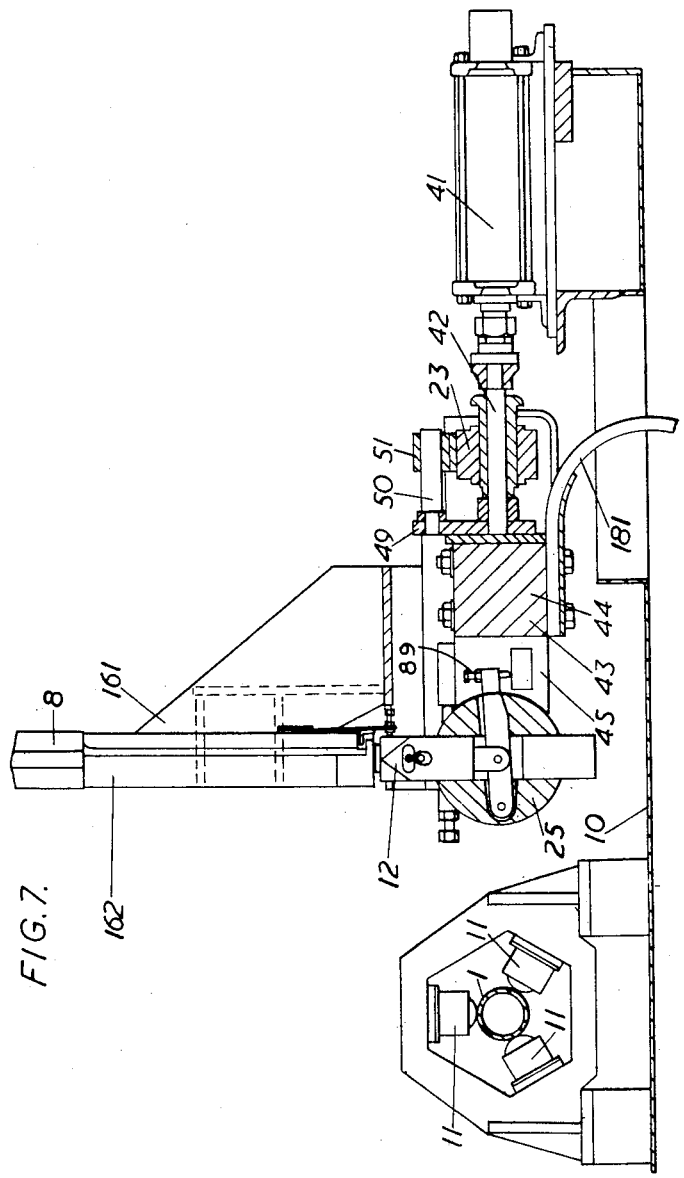
FIGURE 7 is a sectional rear elevation view of the stud-moving means shown in FIGURE 5.
Figure 8:
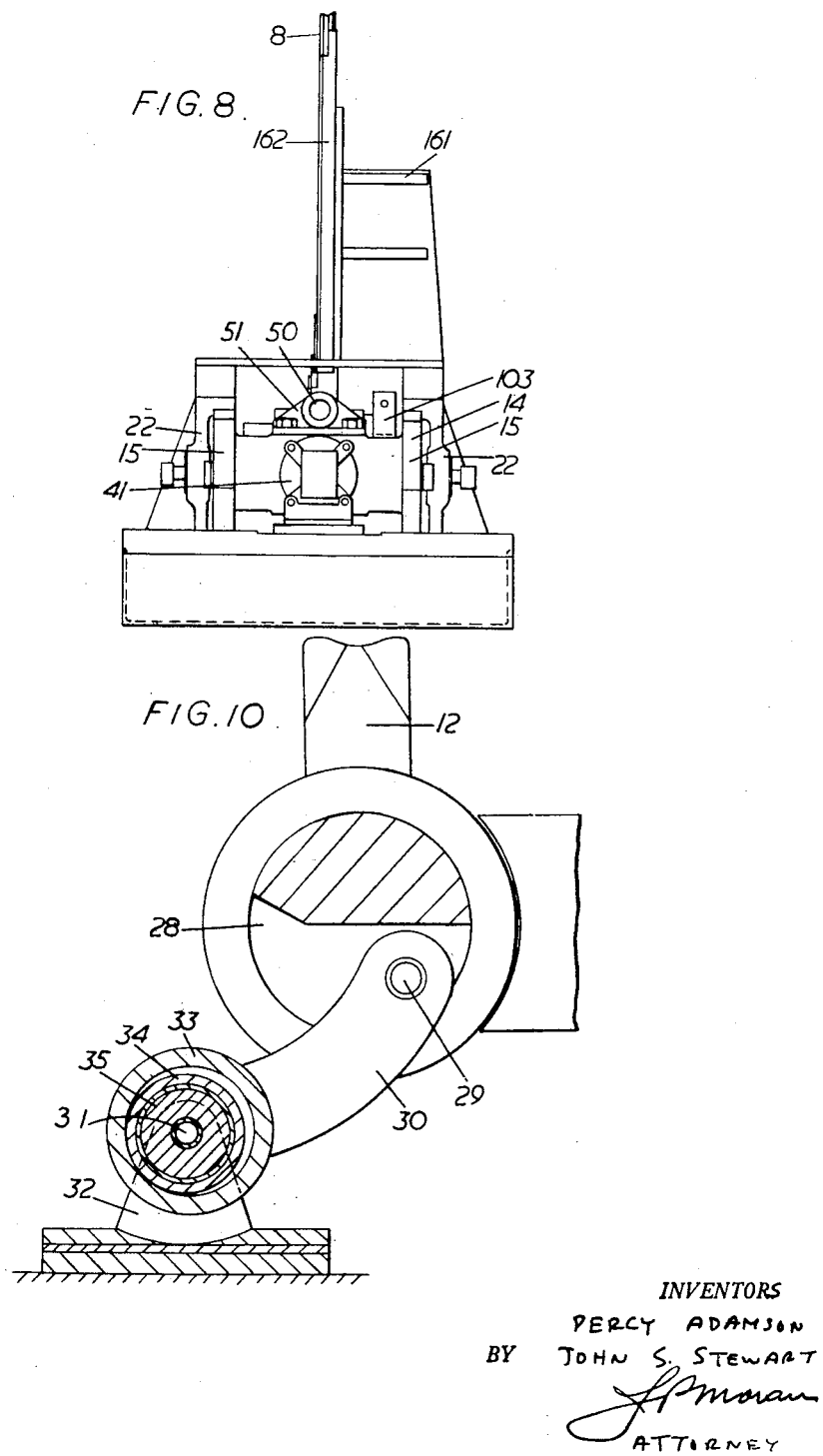
FIGURE 8 is a side elevation or end view of the stud-moving means shown in FIGURE 5, omitting the items of FIGURES 43 and 44.

Referring more particularly to FIGURES 4 to 19, the unstudded part of the tube adjacent the stud-welding position passes through a support 9 comprising a bracket mounted at the front of a table 10 and itself mounting three ball castors 11, FIGURES 6, 7, the balls of which contact with the tube surface at angular positions spaced 120° apart. The part A of the machine to the left of the tube (looking rearwardly) includes a stud holder or electrode 12 mounted on a carriage 13 arranged for horizontal reciprocation towards and away from the tube. The carriage comprises a U-shaped frame-work 14 of which the opposite parallel limbs 15 provide slide surfaces 21, slidably engaging respective limbs of a slideway 22 mounted upon the table 10; the said opposite parallel limbs 15 extend away from a transverse member 23 of the U beyond the slide surfaces 21 and adjacent their ends provide bearing for journals 24 at the opposite ends of a rotatable drum or barrel 25 of which the axis extends transversely of the direction of reciprocatory motion of the frame-work, i.e., extends parallel to the tube. The stud holder or electrode 12 is mounted, in the manner to be described, upon the drum or barrel 25 so as to project radially outwardly therefrom.

The drum is of brass and is formed in two parts bolted together, a front part 26 and a rear part 27. The rear drum part is formed near the adjacent U-shaped frame-work rear limb 15 with a slot-like recess 28 (see FIGURES 10 and 11) extending transversely to the drum axis, which recess is spanned by a pin 29 of which the axis is parallel to the drum axis. Connected to the pin 29 there is pivoted one end of a link or tilt lever 30 of which the other end pivots on a fixed fulcrum pin 31; the axis of the fulcrum pin is also parallel to the drum axis and it extends between brackets of a fixed fulcrum support 32 mounted on the table. The pivoting of the appropriate end of the link 30 on the fulcrum pin 31 provides a loose joint, for the said link terminates in a collar 33 which is of greater internal diameter than the external diameter of a bush 34 encircling the fulcrum pin. Between the bush 34 and the fulcrum pin 31 is interposed a resilient bushing 35 consisting of a rubber composition sandwiched between internal and external collars. The link ensures a relation between the angular position of the drum and the position of the carriage in the reciprocatory direction, said relation, however, admitting of play due to the looseness of the joint and to the resilience of the bushing. The relationship is such that when the carriage is in its fully retracted position most remote from the tube, the electrode extends upright above the drum in the manner indicated in FIGURE 10 and in the other relevant figures and when the carriage is in its fully projected position, nearest the tube, the electrode projects towards the tube in the manner indicated in FIGURE 11.

The carriage is projectable and retractable by a hydraulic or pneumatic pressure. In the illustrated embodiment a pneumatic cylinder 41 is mounted on the table and the horizontal thrust perpendicular to the tube 1, from the piston therein, is transmitted by a shaft 42 extending through the transverse member 23 of the U-shaped frame-work to a thrust block 43 between the opposite parallel limbs 15 of the frame-work. The thrust block 43 includes a brass contact piece 44 having two spaced contact arms 45, 46 projecting towards the tube; the front contact arm 45 is shaped to conform to a cylindrical surface 47 on the front drum part 26, and the rear contact arm 46 is shaped to conform to a cylindrical surface having the same curvature as the cylindrical surface 48 on the rear drum part 27. A thrust from the piston operates for projection of the carriage through the contact arms 45 and 47 acting directly upon the drum 25. The thrust block 43 has a certain amount of lost motion within the framework 14 so that when the direction of thrust from the piston is reversed the contact arms 45 and 46 move slightly away from the cylindrical drum surfaces 47 and 48, thereby saving wear; the retractive thrust is transmitted to the frame-work from the thrust block 43 through contracting faces of the thrust block and of the shaft bearing in the transverse member of the frame-work. The thrust block is supported within the frame-work 14 with the aid of a bracket 49 secured thereto, and carrying at its upper end a slide 50 movable to the desired extent in a slideway 51 at the top of the transverse member 23 of the frame-work.

Figure 9:
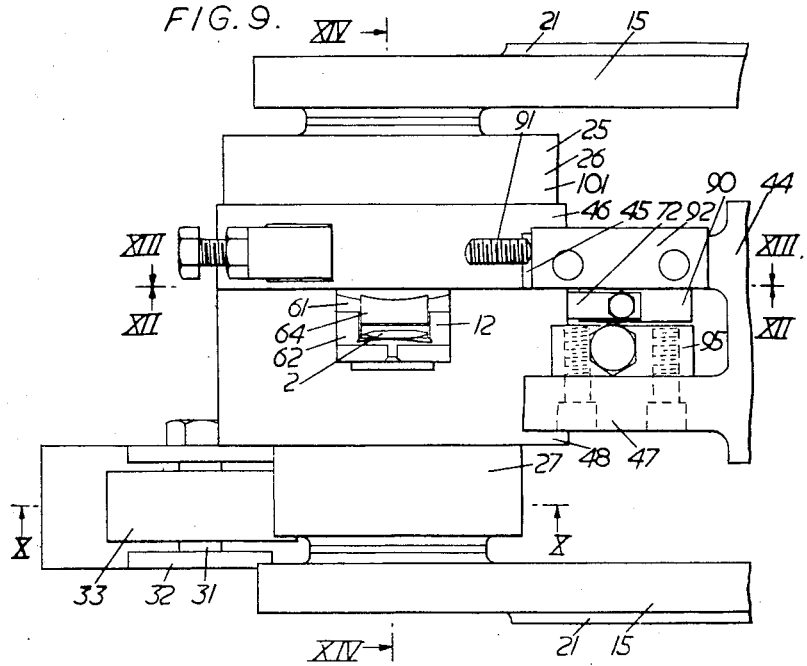
FIGURE 9 is a plan view to a larger scale of certain parts of the stud-moving means.
Figure 11:
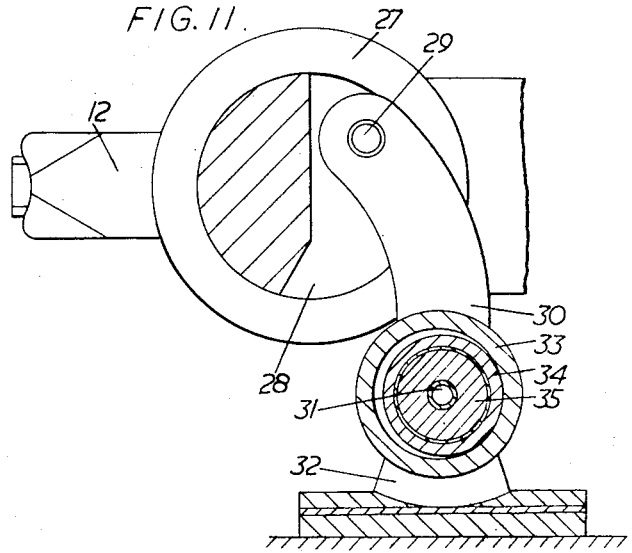
FIGURE 11 is similar to FIGURE 10 but shows the said elements in alternative relative positions.

The stud holder or electrode 12 is a rectangular structure box-like in cross-section perpendicular to its axis; the front of the box is provided by a front electrode part 61 and the sides and rear of the box are provided by a rear electrode part 62 FIGURE 9. The electrode, of which the axis intersects the drum axis at right angles, is arranged with about half its length projecting radially of the drum outwardly of its cylindrical surfaces 47 and 48, the remainder of the electrode being ensconced in a part of the length of a channel 63, FIGURE 13, which extends diametrically through the drum; the channel is bounded on three sides by the rear drum part 27, and on the remaining side by the front drum part 26.

A stud 2 is adapted to be gripped in the electrode between the front face of the rear electrode part 62 and a stud grip 64 which is disposed within the outer part of the box space formed by the electrode parts 61 and 62, FIGURE 14. The inner end of the stud grip is located in a recess 65 in the outer end of a connecting link 66 and is connected thereto by a removable pin 67 extending through appropriate bores in the connecting link and the part of the stud grip 64 within the recess. The connecting link extends within the inner part of the box space and the link inner end is pivotally connected to a lever 68 at a point thereof intermediate its ends. The lever 68 extends transversely of the channel 63 and in recesses 69 formed in the rear drum part 27, one end 70 of the lever 68 is pivotally connected to the rear drum part by a pin 71, and the other end 72 of the lever projects outwardly of the drum. A compression spring 73 the two ends of which are housed in respective bores in the lever 68 and the rear drum part 27 is arranged to urge the lever 68 about its pivot 71 in the direction appropriate to a radially inward movement of the stud grip 64 in the box space.

The rear outer edge 81 of the front electrode part 61 is chamfered and the front of the outer end 82 of the stud grip is correspondingly sloped so that a radially inward movement of the stud grip 64 in the box space must be accompanied by a rearward movement of the stud grip in the box space, which is in the direction to apply a gripping force to the stud 2 in the electrode 12. Compression springs 83 partly housed in bores in the rear electrode part press forwardly upon the stud grip 64 so that when the lever 68 is moved against the compression spring 73 and the stud grip 64 is moved radially outwardly in the box space by the connecting link 66, the stud grip is urged forward in the box space so that the stud receiving recess 84 in the electrode between the stud grip and the rear electrode part 62 is widened. To facilitate these movements the stud grip is mounted on the pin 67 with a certain degree of looseness.

To the stud grip there is riveted a rearward projection 85 which forms the base of the stud receiving recess 84 in the electrode. The rear electrode part is recessed to accommodate this projection; it is upon this projection 85 that the compression springs 83 bear. Respective radially extending slots 86 and 87 are formed in the front and rear electrode parts to accommodate the two ends of the pin 67 connecting the stud grip and the connecting link.

The rear electrode part 62 is, as indicated at 88, cut away from the regions adjacent its outer lateral corners, in order that, when the electrode is in the stud applying position, the said part may clear the studs of a previously applied set of six.

The end 72 of the lever 68 projecting outwardly of the drum lies, when the carriage is in its retracted position, in the space between the contact arms 45 and 46. The said end of the lever 68 is provided with a screw 89 lockable in the position the end of which bears, when the carriage is in its fully retracted position, against a stop 90 secured by screws to the front contact arm 45; contact between the screw 89 and the stop 90 ensures movement of the lever 68 with respect to the drum 25 against able in position the end of which bears, when the electrode is returned to the vertical position, the stud receiving recess in the electrode 12. Co-operation between a screw 91 lockable in position upon the front drum part 26 and a stop 92 screwed to the upper face of the front contact arm 45 ensures that the drum, rotated by the link 30 when the carriage is retracted, is brought to rest as soon as the electrode atains the vertical position. Co-operation between a stop 93 mounted upon the rear drum part 27 diametrically opposite to the electrode 12 and a screw 94 lockable in position upon a block 95 mounted upon the rear contact arm 46 ensures that rotation of the drum when the carriage is advanced stops when the electrode is horizontal.

The front drum part 25 is formed in front of the cylindrical surface 47 with a cylindrical surface 101 on which bears the shoe 102 of a spring loaded brake 103 mounted on the frame-work 14.

Referring more particularly to FIGURES 20 to 34, the loose stud reservoir 6 of the same left-hand part A of the installation, which studs are to be dispensed or retailed one by one to the stud holder or electrode, comprises a circular flat-bottomed bowl or tray 121 rigidly secured to the top of a vibrator 122 adapted to vibrate the bowl 121 helically about its vertical axis, whereby studs on the bowl floor 123 tend to move around the bowl axis in a counter-clockwise direction. The bowl will be described in detail with reference to the drawings; as regards the vibrator, however, of which only the outer casing is shown, it will suffice to say that it is suitably of a known kind comprising a frame to which vibrations are given by electro-magnetic vibration generating means and which is mounted on the upper ends of lead springs angularly distributed around the frame and of which the lower ends are fixed are inclined at the same angle to the vertical and symmetrically as regards the frame so that the vibrations effected have the desired helical direction.

To the inner side of the wall 124 of the bowl there is welded metal strip to form a track 125 adapted to lead studs, tending, under the influence of the vibrations, to move anti-clockwise around the bowl axis, from the bowl floor to the level of the rim of the bowl and horizontally around the bowl adjacent the rim to a stud take-off piece 126. The part 127 of the track which leads studs from the bowl floor to the bowl rim level rises helically within the bowl an angular distance around the bowl axis of 360°, and is of greater width than a stud and (except where it contacts the bowl floor) slopes in a vertical plane through the bowl axis inwardly and downwardly at an angle of 12° to the horizontal. The inner edge of the strip constituting the track part 127 is turned upwardly to form a retaining wall 128 of height equal to the stud thickness; should a stud on the track part 127 mount, under the influence of the vibrations, upon another stud, the former stud may move downwardly and inwardly and fall to the bowl floor, but otherwise the wall 128 retains studs on the track. At its origin 129 on the bowl floor the track is horizontal in a vertical plane radially through the bowl axis and the wall 128 at the inner edge of the track is tapered off in height towards the bowl floor.

The greater part of the track part 130 which leads studs horizontally around the bowl rim from the upper end of the helical track 127 to the stud take-off piece 126 is of less width than a stud and slopes (in a vertical radial plane) outwardly and upwardly at an ngle of 12° to the horizontal (as in FIGURE 26); the bowl is provided with an upward extension 131 to its wall in the region of this track path to retain the studs on the track. In a transitional length 132 of the track the strip constituting the track is twisted from the one inclination to the other and reduced in width from the helical track width to the narrow track width.

At the beginning of the narrow track part 130 a trip plate 133 is secured to the bowl wall extension 131 providing a rib 134 extending radially inwardly from the said wall extension above the outermost part of the track. In its front part the rib 134 tapers in width to zero forwardly, i.e., in the direction from which studs are approaching it; the distance of the rib from the track increases in the direction in which studs move over the track from a dimension less than the stud width to a dimension greater than the stud width; and the lower surface 135 of the rib facing the track slopes inwardly and upwardly at a greater angle to the horizontal than the track.

Studs which reach the trip plate 133 with end faces 5 in front are little influenced by the presence of the trip plate, which effects merely a slight temporary inward bend in the steady paths of the studs along the track around the bowl axis. When a stud approaches the trip plate with an edge face 4 in front, however, the trip plate retards the forward movement of the outermost part of the stud and the stud tends, while advancing, to turn through 90° around its axis and to proceed along and past the remainder of the trip plate and along the track part 130 in the same way as studs which have approached the trip plate with end faces in front.

In front of the take-off piece 126 a shroud plate 141 is welded to the bowl wall upward extension the lower end of which shroud plate is spaced from the track a sufficient distance to permit the movement along the track of one stud at a time, but is close enough to the track to prevent the onward movement along the track of a stud which may be mounted upon another stud.

In front of the shroud plate 141 the track is formed with a spill section 142, in which the upward and inward inclination of the track to the horizontal is 30° instead of 12°. In the bowl wall extension 131 there is formed adjacent the spill section a horizontal groove 143 into which the lateral edge faces 4 of studs may enter, but is too narrow for the entry therein of the end edge faces 5 of the studs. Along the spill section, moreover, the track is reduced in width from its dimension in the remaining lengths of the horizontal track part 130. The relation between the dimensions of the groove 143 and the width of the track in the spill section 142 are such that a stud travelling along the track in the spill section with an end face in front tends to remain on the track by reason of the entry into the groove 143 of one of its outer lateral edge faces 4, whereas a stud on the track in the spill section orientated with a lateral edge face 4 in front will have its center of gravity further from the bowl wall extension than the inner edge of the track so that it will fall from the track.

It is found that a stud which reaches the shroud plate 141 upon the back of another stud and of which the onward movement is checked by the shroud plate, will soon overturn and fall to the bowl floor from the spill section.

If desired, an aperture may be provided in the helical part 127 of the track for the rejection from the track of objects traveling thereon while permitting normal studs of 1 inch square dimension to pass. The aperture 144 shown in FIGURES 31 and 32 is mainly rectangular in shape and primarily intended for the rejection from the track of studs of ½ inch by 1 inch dimensions; at one part 145 the aperture 144 extends radially inwardly as far as the upturned track inner wall 128, whereby small objects such as nuts and bolts may fall from the track. Objects falling from the track are directed by a plate 146 below the aperture through an outlet 147 in the subjacent part of the wall 124 of the bowl.

FIGURE 33 refers to a modification applicable to a possible case when studs 1 inch in breadth between side edges but only ¾ inch long along their axes are used. In this modification, the narrow horizontal part 130 of the track is widened at one point and an aperture 148 9/16 inch wide spaced 5/16 inch from the bowl wall is formed in the track. Studs of the dimensions described attaining to the aperture sideways-on will, since one end face will be in contact with the bowl wall extension 131, overbalance and fall through the aperture; studs attaining to the aperture end-on will, however, span the aperture and continue on along the track.

The stud take-off piece 126 comprises an assembly of plates secured together and attached to the bowl wall by an arcuate plate, welded to the take-off piece and encircling a part of the drum wall. The take-off piece provides a longitudinal passageway 150 for studs in the end-on position, and is located at an angle of 12° to the horizontal and so as to receive studs traveling along the track under the shroud 141. The upper part of the take-off piece is formed with a longitudinal opening 151 so that the studs in the passageway may be visually observed and so that access may be secured to the studs.

Referring more particularly to FIGURES 35 to 39, secured to the two limbs of the slideway and extending above the carriage is a bracket 161 to which is secured a vertically extending stud magazine or feed termination piece 162, the lower end of which is immediately above the position occupied by the electrode when the carriage is in the fully retracted position. The feed termination piece is adapted for the delivery of studs to the electrode when the carriage is in the fully retracted position, to which end it provides a vertical stud channel 163 therein which, when the carriage is in the fully retracted position, is in line with the stud-receiving recess 84 of the electrode.

The vertical stud channel 163 is provided by a vertical recess in a front component 164, a guide plate 165 at the lower end of the feed termination piece which at the lowermost end thereof extends completely across the recess, and a cover plate 166 which over the remainder of the height of the feed termination piece extends only partly across the recess, a vertical access opening 167 being left through which the studs in the feed channel are visible from the rear.

The studs which enter the top of the feed termination piece are led thereto from the stud take-off piece 126 through a feed channel 168 which leads (see FIGURE 21) rearwardly from the take-off piece and downwardly in a quadrant of a circle and then vertically downwardly to the feed termination piece 162. The feed channel comprises metal strips bolted together to define a passageway to the studs to which access is obtainable through a longitudinal opening 169 to the rear of the feed channel.

To the outer side of the front component 164 of the feed termination piece there is secured near the lower end thereof a lead spring 170 reinforced by a backing spring plate 171, to which is attached a contact piece 172 having a striker 173 projecting inwardly through a passage in the feed termination piece. The contact piece is movable by the electrode 12 which when the carriage is in its fully retracted position bears against a screw 174 lockable in position with respect to the contact piece 172; the arrangement is such that shortly after the carriage leaves its fully retracted position and the electrode consequently advances away from its vertical position, the left spring brings the striker 173 to apply against the outer lateral edge face of the lowermost stud in the feed termination piece such force as, by friction, to retain said stud in position.

A spring loaded screw 175 is provided in the feed termination piece which can, by being turned by hand, be brought to bear against a stud in the feed termination piece to prevent movement of studs in the feed termination piece if desired.

The part B of the machine to the right of the tube (looking rearwardly) is of construction similar to that described and illustrated for the part A, but of opposite hand. Thus, studs in the bowl 6 of the right-hand part B of the installation travel along the stud track therein in a clockwise sense around the bowl axis. When pneumatic pressure is applied to the piston of the part B of the installation so as to advance the carriage thereof towards the tube, the electrode thereof moves from a location beneath the feed termination piece thereof to a location adjacent the tube and from a vertical position to a horizontal position. It is arranged that when an appropriate electrical signal is supplied pneumatic pressure is applied simultaneously to the pistons of the machine parts A and B in the carriage-advancing sense, and when another appropriate electric signal is supplied pneumatic pressure is applied simultaneously to the pistons of the machine parts A and B in the carriage-retracting sense.

Conductors (of which the conductor 131 for the machine part A is shown in FIGURE 7) lead respectively to the brass contact pieces of the machine parts A and B from a transformer (not shown) suitably located beneath the table. When by means of pneumatic pressure the carriages are advanced so that the electrodes hold studs at opposite ends of a tube diameter and press end faces of the said studs against the tube surface, an alternating current from the transformer may pass through the tube from one stud to the other and heat the contacting surfaces of the studs and the tube; the current strength and the force exerted by the pneumatic pressure are sufficient to effect welding of the studs to the tube. When each carriage is projected to within a predetermined distance from its fully projected position, a cam (not shown) thereon depresses a plunger (not shown); it is arranged that without the prior depression of the plungers of both carriages, welding current cannot be applied to the conductors.

Suitable insulation, including, for example, insulation 183 at the bearing of the drums in the carriages (FIGURE 14), insulation 184 at the pivots in the drums of the tilt levers (FIGURE 14) and insulation 185 at the connection between the feed termination pieces and the brackets therefor (FIGURE 38) is provided against the escape of electric current.

For moving the tube rearwardly and for rotating the tube a wheeled transporter 186 is provided which is mounted on rails 187 extending rearwardly along a bed 188. From the transporter depend two pawls 189 and 190 (FIGURE 4), the former pawl engaging with a stationary rack 191 extending along the bed between the rails and preventing the forward movement of the transporter under the pull of a cable (not shown) tensioned by a weight (not shown), while the latter pawl engages with a movable rack 192 which also extends along the bed between the rails and is longitudinally reciprocable by electro-pneumatic means (not shown) suitably located below the bed beneath the front end thereof, the arrangement being such that when an electric impulse is transmitted to the said electro-pneumatic means a complete longitudinal reciprocation of the movable rack 192 is caused and effects a rearward step of the transporter by a distance equal to the pitch of the stationary rack, said pitch being ¼ inch.

The transporter includes a chuck 194 for holding the rear end of the tube, and turning means 195 for effecting rotary movements of the tube. The said turning means are electro-pneumatic, and adapted so that when an electric impulse is transmitted thereto, pneumatic pressure is brought into play to effect turning of the tube through 30°.

Referring more particularly to FIGURES 5 and 43 to 45, upon a bracket 201 on the table 10 are mounted two micro-switches the plungers 202 and 203 of which project towards the cylindrical surface 204 of a rotary member 205 mounted on the bracket. The rotary member 205 is driven uni-directionally through a ratchet and pawl arrangement from a member 206 also mounted on the bracket and rockable about the axis of the rotary member 205 by a connecting link 207 one end of which is pivoted on the member 206 while the other end is reciprocable with the shaft 42 of the machine part A. The pawl and ratchet arrangement does not engage during projection of the carriage, but engages during retraction of the carriage and at each retraction rotates the rotary member 205 from one to the next of three angular positions spaced 120° apart. From the cylindrical surface 204 project lands of which two lands 208, on the rotary member 205 rotating from a first (X) of the three angular positions to the second (Y) of the three angular positions, successively and temporarily engage the switch plunger 202; two lands 209, as the rotary member rotates from the second angular position (Y) to the third angular position (Z), successively engage the switch plunger 202; and as the rotary member rotates from the third angular position (Z) to the first angular position (X), one land 210 engages the switch plunger 202 and one land 211 engages the switch plunger 203. Each time the switch plunger 202 is engaged, an electric impulse is directed to the electro-pneumatic turning means 195, and each time the switch plunger 203 is engaged, an electric impulse is directed to the electro-pneumatic means which effects longitudinal movement of the tube by one rearward step.

It is arranged by means including cams on the carriages and plungers on the stationary parts of the installation that unless both carriages have withdrawn a predetermined distance from their fully projected positions, electric impulses can be directed neither to the electro-pneumatic turning means nor to the electro-pneumatic means which effect longitudinal tube movement.

Further, it is arranged that when the electro-pneumatic means which effect longitudinal tube movement is in operation, electric impulses cannot be applied for projection of the carriages.

When a sufficiently long tube requires to be studded, it will require support between the support 9 and the transporter 186. FIGURES 41 and 42 show a support trolley 221 arranged for running on the rails 187. Said trolley mounts a bracket 222 itself mounting two ball castors 223, the balls of which bear, at angular positions spaced 60° on each side of the vertical, on a length of the tube surface which is left bare of studs for some purpose such as for enabling intermediate support of the tube in the heat exchanger for which it is destined. The support trolley is secured to the transporter by a line or rod (not shown) so that it maintains its longitudinal position relative to the tube. Generally the tube will require support at a location or locations in front of the table 10 which may be supplied by a support column or columns each mounting a two-ball-castor bracket like the bracket 222 on the support trolley 221.

In operation, an appropriate electric signal ensures that pneumatic pressure is applied simultaneously to the pistons of the machine parts A and B in the carriage-advancing sense. As the carriage is advanced towards the tube 1 to be studded the tilt levers ensure that the drums will rotate so that the electrodes projecting from the drums, each with a stud gripped therein, are moved from the stud loading stations below the stud magazines to positions adjacent the tube in which they extend horizontally, and in which further rotations of the drums are prevented by the appropriate stops. As the carriages continue to advance, the electrodes, projecting in horizontal directions, are moved only horizontally, and the end faces of the studs are forced by pneumatic pressure against the tube surface at opposite ends of a horizontal diameter. An electronic timer now ensures that current is passed from the transformer in a circuit including the two electrodes, the two studs and the tube sufficient to weld the studs to the tube. The electronic timer now supplies an appropriate electric signal to effect the application of pneumatic pressure simultaneously to the pistons in the carriage-retracting sense. During the first movements of the carriages in the retracting direction, the manner of mounting of the tilt levers on the fulcrum pins permits the horizontal movements of the electrodes necessary since the studs are now welded to the tube. When the carriages are fully retracted, the electrodes project vertically of the drum thereof in stud loading locations at the bottoms of the stud magazines, where the lowermost studs in the magazines drop into the stud receiving recesses in the electrodes.

Figure 1:
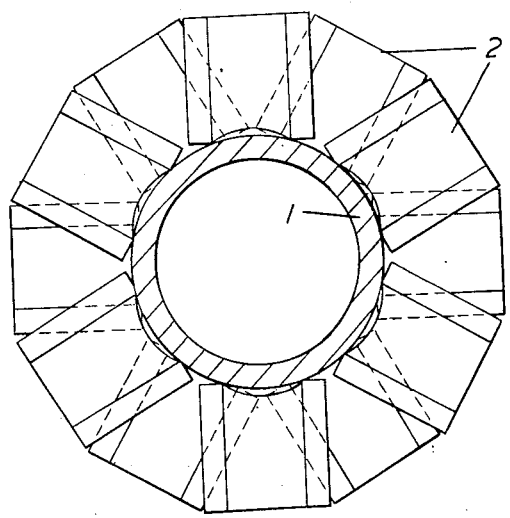
FIGURE 1 is a transverse section through a tube provided with welded-on fin-like studs.

During the retraction of the carriage in the machine part A, the rotary member 205 is rotated from, say, the position X to the position Y, whereupon two successive electric signals are supplied which effect turning of the tube 1 by 60°. Then two more studs are applied to the tubes at opposite ends of a horizontal diameter, which is at 60° to the diameter defined by the previously applied studs. Again the rotary member 205 is rotated to the next position Z, two more studs are welded to the tube at opposite ends of a third tube diameter at 60° to the diameters defined by the previous two pairs of studs, the rotary member is rotated to the position X whereupon the tube is turned by 30° and moved longitudinally by ¼ inch and the process is repeated, resulting in an array of studs as shown in FIGURES 1 and 2.

In any suitable manner, liquid jets cool the electrodes after welding. With the described array of closely spaced studs it would appear that heat dissipation by the studs is sufficient for no provision to be necessary for the cooling of the tube by the flow of liquid therethrough.

Modifications of the electrodes, magazine, feed channel, and stud reservoir may be made if it is desired to apply studs of different form. By modifying the projection 85 riveted to the stud grip 64 so as to reduce by an appropriate amount the depth of the stud receiving recess in the electrode, the electrode 12 may be modified for the application of studs of shapes similar to those shown but of length, measured along the axis, of only ¾ inch.

It will be clear also that by any of various measures, e.g., the replacement of the racks 191 and 192 by racks of different pitches, the re-setting of the electro-pneumatic turning means 195 for operation with an angle of tube turn other than 30°, the replacement of the rotary member 205 by a rotary member having a different arrangement of switch-operating lands thereon, the "pattern" of the array of welded-on studs on the tube will be changed; means are available, therefore, for securing alternative "patterns."

While specific embodiments of the invention have been shown and described in detail to illustrate the application of the invention principles, it will be understood that the invention may be embodied otherwise without departing from such principles.

What is claimed is:

1. A machine for electrically welding a succession of studs in a predetermined sequence to a surface comprising a table having a stud loading station and a stud welding station, a stud holding means movably mounted on said table, means for moving said stud holding means between the stud loading station and stud welding station, a stud reservoir, and means for continuously feeding and dispensing studs successively and individually from said reservoir to said stud holding means each time the stud holding means moves to the stud loading station and means for indexing said surface after each stud welding operation, said indexing means being rendered operative upon retraction of the stud holding means from the stud welding station to the stud loading station.

2. A machine for electrically welding a succession of studs in a predetermined sequence to a surface comprising a table having a stud loading station and a stud welding station, a stud holding means movably mounted on said table, means for moving said stud holding means with a reciprocatory and rotary movement between the stud loading station and stud welding station, a stud reservoir, means for vibrating said reservoir for successively feeding and dispensing studs individually from said reservoir to said stud holding means each time said stud holder moves to the stud loading position.

3. The invention as defined in claim 2 wherein said stud holding means includes a carriage mounted on said table for reciprocatory movement toward and away from the surface to be studded, and an electrode rotatably mounted on said carriage for movement between a stud loading station and a stud welding station.

4. The invention as defined in claim 3 wherein said electrode includes a recess for receiving a stud, a stud grip forming a movable wall of said recess, and means for actuating said stud grip to vary the size of the recess.

5. A machine for electrically welding a sequential succession of studs to a surface comprising a table having a stud loading station and a stud welding station, a stud holding means movably mounted on said table, said stud holding means including a carriage mounted on said table for reciprocatory movement toward and away from the surface to be studded, a drum rotatably connected to said carriage to rotate therewith, means for reciprocating said carriage, said reciprocating means including a thrust block having bifurcated contact arms with cylindrically curved contact surfaces for engaging said drum, and means for rotating said drum upon the actuation of said thrust block.

6. The invention as defined in claim 4 wherein said rotating means includes a lever having one end eccentrically connected to a pivot on said drum, and its other end pivoted about a fixed bearing, one end of said lever being mounted upon its pivot so as to permit a predeterminate degree of reciprocatory movement of said carriage without a corresponding rotation of said drum and connected electrode.

7. A machine for electrically welding a succession of studs in a predetermined sequence to a surface comprising a table having a stud loading station and a stud welding station, a stud holding means movably mounted on said table, said stud holding means including a carriage mounted on said table for a reciprocating movement toward and away from the surface to be studded, a drum rotatably connected to said carriage, an electrode connected to said drum and projecting radially outwardly therefrom, said electrode having a recess in its outer end portion for receiving a stud, a stud grip forming a movable wall of said recess, and means for actuating said stud grip to vary the size of said recess upon rotation of said drum, said latter means including a linkage arrangement of a lever projecting radially outwardly of said drum, one end of said lever being eccentrically pivoted to said drum, and said other end adapted to engage a limit stop when said carriage is in stud loading position, and a connecting link pivotally connected to said lever intermediate the ends of said lever and to said stud grip, means for reciprocating said carriage on said table, means rendered operative by the reciprocation of said carriage to rotate said drum during a movement between the stud loading station and stud welding station, a stud reservoir, means for vibrating said reservoir for successively feeding and dispensing studs individually from said reservoir to the recess of said electrode each time said stud holding means moves to the stud loading position.

8. The invention as defined in claim 7 wherein said means for rotating said drum upon reciprocation of said carriage includes a drum rotating lever having one end eccentrically connected thereto and the other end connected to a fixed bearing, said lever being connected to said bearing in a manner to permit a predeterminate amount of reciprocating movement of said carriage without a corresponding rotation of said drum and connected electrode.

9. A machine for welding a succession of studs radially about a longitudinally extending surface of a tube in a predetermined sequence comprising a table, means for supporting a tube thereon, a stud holding means laterally disposed on opposed side portions of a tube supported on said table, each of said stud holding means being substantially simultaneously moved toward and away from said tube between a respective loading station and a welding station, each of said stud holding means includes a carriage slidably mounted on said frame, a drum rotatively connected on said carriage, means for reciprocating said carriage between a stud holding station and a stud welding station, an electrode connected to said drum and projecting radially outwardly therefrom, means for rotating said drum and connected electrode upon actuation of said carriage reciprocating means, said reciprocating means and rotating means coacting to move said electrode between a stud loading station and a stud welding station, said electrode having a recessed portion for receiving a stud, a movable jaw for securely gripping a stud positioned in said recess, means for actuating said jaw between operative and inoperative position upon the rotation of said drum, a reservoir for containing a supply of studs, feeding and dispensing means for successively and individually feeding the studs from said reservoir to said electrode when the latter is in the stud loading station, means for vibrating said reservoir for continuously maintaining a feed of studs from said reservoir to said feeding and dispensing means, and means for indexing the tube after a welding operation.

10. A machine for electrically welding a plurality of studs simultaneously to a surface in a predetermined sequence comprising a table for supporting a surface to be studded and having a stud loading station and a stud welding station, a stud holding means movably mounted on said table, means for moving said stud holding means between the stud loading station and stud welding station, a stud reservoir for supplying studs to said stud holding means, said reservoir including a bowl having a floor and an upper rim portion, a stud track disposed in said bowl adapted to lead studs upwardly from the floor of said bowl to an upper rim portion thereof, and means for vibrating said bowl in a manner for motivating the stud up said track.

11. The machine as claimed in claim 10 wherein said stud track is arranged to lead studs upwardly from the bowl floor in a helical path adjacent the wall of said bowl.

12. The invention as defined in claim 10 wherein said track includes an initial stud receiving portion having an upwardly turned flange adjacent its inner edge to form a retaining wall of a height substantially equal to the thickness of said stud, said track portion being sloped downwardly and inwardly of said bowl so that a stud mounted upon another may be discharged therefrom.

13. The invention as defined in claim 12 wherein said track includes an intermediate portion forming a continuation of said initial stud receiving portion, said intermediate portion sloping upwardly and inwardly, and tripping means associated with said intermediate track portion for rotating any stud which is moving up said track improperly orientated thereon.

14. The invention as defined in claim 13 wherein said track includes a spill section adjacent the upper end portion thereof and constituting a continuation of said intermediate track portion, said track being arranged so that the center of gravity of the studs positioned on said spill section automatically discharges the improperly disposed stud from said track.

15. The invention as defined in claim 14 including a recess in the wall of said bowl adjacent the spill portion of the track to accommodate an edge portion of a properly orientated stud thereon.

16. A machine as claimed in claim 12 in which the correct orientation on the track of fin-like studs having one dimension shorter than another is with the short dimension parallel to the stud path along the track, wherein at a location for the discharge of incorrectly orientated studs the track is formed with an aperture of such dimensions and so located with respect to a wall to the track towards which the track slopes laterally that correctly orientated studs bridge the aperture but incorrectly orientated studs fall through the aperture.

17. A machine as claimed in claim 12, in which the correct orientation on the track of fin-like rectangular studs having chamfered the four edges parallel to an axis thereof is with the said axis parallel to the stud path along the track, wherein means is provided in association with the track for effecting correction of the orientation of studs on the track, comprising a member arranged at one side of the track and so as, by contacting a stud upper chamfer of each stud, to retard, sufficiently for the desired re-orientation, the onward movement along the track of one side of each stud incorrectly orientated.

18. A machine as claimed in claim 17, wherein subsequent to the means for effecting correction of stud orientation on the track the track is adapted for the discharge therefrom of studs of which the orientation remains uncorrected.

19. A machine as claimed in claim 12, in which the correct orientation on the track of fin-like square studs having chamfered the four edges parallel to an axis thereof is with the said axis parallel to the stud path along the track, wherein the said track, at a location for the discharge of incorrectly orientated studs, slopes laterally towards a wall to the track formed with a recess adapted to accommodate sides of the studs at the chamfered edges thereof and is of such width as to support studs of which sides enter the recess but of insufficient width to support studs incorrectly orientated.

20. A machine as claimed in claim 12, wherein the track at a locattion where it slopes laterally towards a stud-retaining wall is formed with an aperture adjoining said wall and adapted for the discharge from the track of foreign material.

21. A machine as claimed in claim 20, wherein a deflecting surface is provided below the aperture for foreign material effective in conjunction with an aperture in the bowl wall to discharge said foreign material from the bowl.

22. A machine as claimed in claim 12, wherein adjoining the end of the track means are provided adapted to prevent the attainment to the end of the track of a stud lying upon another stud.

23. A machine as claimed in claim 10, wherein the stud reservoir is arranged at a height of several feet above the stud loading station.

24. A machine as claimed in claim 12, wherein the feed channel is of an open form adapted to give access to studs therein whilst constraining the studs.

25. A machine as claimed in claim 23, wherein a brake is provided adapted when the stud holding means is removed from the stud loading station by bearing upon the lowermost stud in the magazine to retain the studs in the magazine, and means is provided effective to remove the brake from the lowermost stud automatically when the stud holder attains to the stud loading position.

26. A machine for electrically welding a succession of studs in a predetermined sequence to a tubular surface comprising a table having a stud loading station and a stud welding station, a stud holding means removably mounted on said table, means for moving said stud holding means between the stud loading station and stud welding station, a stud reservoir, means for continuously feeding and dispensing studs successively and individually from said reservoir to said stud holding means each time the stud holding means moves to the stud loading station, a second stud holding means in association with a respective second stud feeding means and stud dispensing means, said first and second mentioned stud holding means being arranged for the resistance welding of studs simultaneously to a tube surface at opposite ends of a tube diameter, and means provided for turning the tube through 60° after welding on a pair of diametrically opposite studs, welding on a second pair of diametrically opposite studs, then turning the tube through another 60° in the same direction, welding on a third pair of diametrically opposite studs, then turning the tube through 30° in the same direction and moving it longitudinally, welding on a pair of diametrically opposite studs and repeating the process.

References Cited in the file of this patent

UNITED STATES PATENTS

| | | |
|---|---|---|
| 2,806,934 | Anderson et al. | Sept. 17, 1957 |
| 2,817,746 | Henderson | Dec. 24, 1957 |